(12) United States Patent
Adachi

(10) Patent No.: US 12,387,420 B2
(45) Date of Patent: Aug. 12, 2025

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventor: Daichi Adachi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 261 days.

(21) Appl. No.: 18/158,495

(22) Filed: Jan. 24, 2023

(65) Prior Publication Data

US 2023/0245378 A1    Aug. 3, 2023

(30) Foreign Application Priority Data

Jan. 31, 2022  (JP) ................. 2022-013580

(51) Int. Cl.
*G06T 15/20*     (2011.01)
*G06T 5/00*      (2006.01)
(Continued)

(52) U.S. Cl.
CPC ............. *G06T 15/20* (2013.01); *G06T 5/00* (2013.01); *G06T 15/60* (2013.01); *G06T 19/20* (2013.01); *G06T 2219/2012* (2013.01)

(58) Field of Classification Search
CPC .......... G06T 15/20; G06T 5/00; G06T 15/60; G06T 19/20; G06T 2219/2012; G06T 2207/10024; G06T 2207/30168; G06T 2207/30196; G06T 7/55; G06T 15/503; G06T 2210/62
See application file for complete search history.

(56) References Cited

U.S. PATENT DOCUMENTS 6,556,197 B1 *  4/2003  Van Hook ................ G06T 1/20
                                                  345/522
7,813,526 B1 * 10/2010  Bourdev ............... G06F 16/583
                                                  382/103
(Continued)

FOREIGN PATENT DOCUMENTS

JP          6415675 B1    10/2018
JP       2019-144638 A     8/2019
(Continued)

OTHER PUBLICATIONS

Notice of Reasons for Refusal issued by the Japanese Patent Office on Jun. 28, 2024in corresponding JP Patent Application No. 2022-013580, with English translation.

*Primary Examiner* — Xiao M Wu
*Assistant Examiner* — George Renze
(74) *Attorney, Agent, or Firm* — Carter, DeLuca & Farrell LLP

(57) ABSTRACT

An information processing apparatus is provided. A three-dimensional model of an object, which has been obtained by capturing an image of the object in an imaging area from a plurality of positions, and information indicating a position of the object with respect to the imaging area are obtained. A virtual viewpoint image that includes the object is generated based on the three-dimensional model of the object through performing correction that accords with a position of the object, on the object in the virtual viewpoint image.

12 Claims, 6 Drawing Sheets

(51) Int. Cl.
    *G06T 15/60*     (2006.01)
    *G06T 19/20*     (2011.01)

(56) References Cited

U.S. PATENT DOCUMENTS

| | | | |
|---|---|---|---|
| 10,510,159 B2 | 12/2019 | Adachi et al. | |
| 2015/0265922 A1* | 9/2015 | Yamane | A63F 13/213 |
| | | | 463/31 |
| 2015/0302635 A1* | 10/2015 | Siddique | G06T 15/20 |
| | | | 345/426 |
| 2016/0119560 A1* | 4/2016 | Hayashi | H04N 25/60 |
| | | | 348/241 |
| 2019/0095710 A1* | 3/2019 | Rees | G06T 5/94 |
| 2019/0206074 A1* | 7/2019 | Oryoji | G06T 17/20 |
| 2019/0371049 A1* | 12/2019 | Hsieh | G06T 15/60 |
| 2020/0169713 A1* | 5/2020 | Umemura | G06T 7/215 |
| 2021/0368206 A1* | 11/2021 | Sugano | G06T 15/04 |
| 2021/0390928 A1* | 12/2021 | Nishibe | H04N 13/239 |
| 2022/0086413 A1 | 3/2022 | Adachi et al. | |

FOREIGN PATENT DOCUMENTS

| | | |
|---|---|---|
| JP | 2020-135290 A | 8/2020 |
| JP | 2021-033525 A | 3/2021 |
| JP | 2021-128592 A | 9/2021 |
| WO | 2019/244944 A1 | 12/2019 |

\* cited by examiner

INFORMATION PROCESSING APPARATUS, INFORMATION PROCESSING METHOD, AND MEDIUM

BACKGROUND

Technical Field

The present disclosure relates to an information processing apparatus, an information processing method, and a medium, and in particular to a system for generating a virtual viewpoint image of an object for when the object is viewed from a virtual viewpoint.

Description of the Related Art

A technique for generating a virtual viewpoint image using a plurality of images, which have been obtained by placing a plurality of imaging apparatuses at different positions and performing synchronous image capturing, has been attracting attention. For example, it is possible to generate a virtual viewpoint image for analyzing a movement and a path of a foreground object by generating a three-dimensional model of the object over a plurality of frames using such a technique.

Japanese Patent Laid-Open No. 2019-144638 discloses increasing a transparency of an object that is close to a virtual viewpoint in a virtual viewpoint image in order to solve a problem that when generating the virtual viewpoint image a resolution decreases if a distance between the virtual viewpoint and a three-dimensional model of the object is too short.

SUMMARY

According to an embodiment, an information processing apparatus comprises one or more processors and one or more memories storing one or more programs which cause the one or more processors to: obtain a three-dimensional model of an object, which has been obtained by capturing an image of the object in an imaging area from a plurality of positions, and information indicating a position of the object with respect to the imaging area; and generate a virtual viewpoint image that includes the object based on the three-dimensional model of the object through performing correction that accords with a position of the object, on the object in the virtual viewpoint image.

According to another embodiment, an information processing apparatus comprises one or more processors and one or more memories storing one or more programs which cause the one or more processors to: obtain a three-dimensional model of an object, which has been obtained by capturing an image of the object in an imaging area from a plurality of positions; determine a backface of each portion of the three-dimensional model of the object; and generate a virtual viewpoint image that includes the object based on the three-dimensional model of the object through determining a portion in which a backface of the three-dimensional model is visible in the virtual viewpoint image and performing correction on the portion in which the backface is visible.

According to still another embodiment, an information processing method comprises: obtaining a three-dimensional model of an object, which has been obtained by capturing an image of the object in an imaging area from a plurality of positions, and information indicating a position of the object with respect to the imaging area; and generating a virtual viewpoint image that includes the object based on the three-dimensional model of the object through performing correction that accords with a position of the object, on the object in the virtual viewpoint image.

According to yet another embodiment, an information processing method comprises: obtaining a three-dimensional model of an object, which has been obtained by capturing an image of the object in an imaging area from a plurality of positions; determining a backface of each portion of the three-dimensional model of the object; and generating a virtual viewpoint image that includes the object based on the three-dimensional model of the object through determining a portion in which a backface of the three-dimensional model is visible in the virtual viewpoint image and performing correction on the portion in which the backface is visible.

According to still yet another embodiment, a non-transitory computer-readable medium stores a program executable by a computer to perform a method comprising: obtaining a three-dimensional model of an object, which has been obtained by capturing an image of the object in an imaging area from a plurality of positions, and information indicating a position of the object with respect to the imaging area; and generating a virtual viewpoint image that includes the object based on the three-dimensional model of the object through performing correction that accords with a position of the object, on the object in the virtual viewpoint image.

According to yet still another embodiment, a non-transitory computer-readable medium stores a program executable by a computer to perform a method comprising: obtaining a three-dimensional model of an object, which has been obtained by capturing an image of the object in an imaging area from a plurality of positions; determining a backface of each portion of the three-dimensional model of the object; and generating a virtual viewpoint image that includes the object based on the three-dimensional model of the object through determining a portion in which a backface of the three-dimensional model is visible in the virtual viewpoint image and performing correction on the portion in which the backface is visible.

Further features of the present disclosure will become apparent from the following description of exemplary embodiments (with reference to the attached drawings).

DESCRIPTION OF THE EMBODIMENTS

Figure 1:
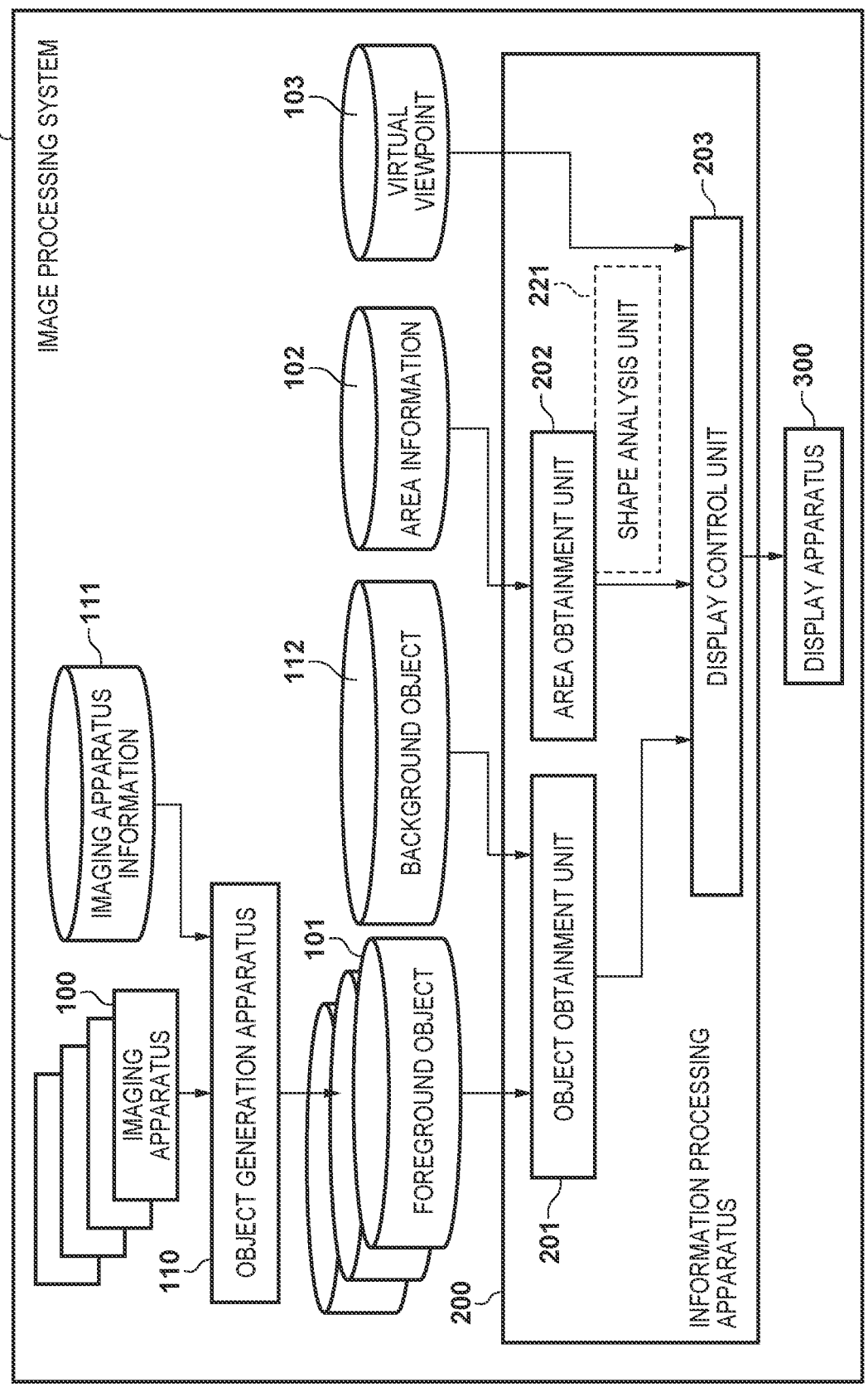
FIG. 1 is a diagram illustrating an example of a configuration of a system according to an embodiment.

Hereinafter, embodiments will be described in detail with reference to the attached drawings. Note, the following embodiments are not intended to limit the scope of the claims. Multiple features are described in the embodiments, but limitation is not made to require all such features, and multiple such features may be combined as appropriate. Furthermore, in the attached drawings, the same reference numerals are given to the same or similar configurations, and redundant description thereof is omitted.

The inventor conceived a configuration in which when creating a three-dimensional model of an object an area in which the three-dimensional model is to be generated is determined in advance and a plurality of imaging apparatuses are placed toward that area. However, if such a configuration is employed, there is a possibility of a decrease in a quality of an image, in a virtual viewpoint image, of an object present at a position where high-precision image capturing is difficult, such as near a boundary of the area. In addition, although it is possible to reduce the amount of data of a three-dimensional model to be generated by employing a configuration in which a three-dimensional model of an object that is positioned outside of the area is not generated, if such a configuration is employed, there is a possibility that a shape of the three-dimensional model may be partially incomplete. Thus, if, for example, a portion of the face is incomplete in an object that is a person, there is a possibility that the backface of the back of the head will be displayed in a virtual viewpoint image, through the portion where the face is missing.

An embodiment of the present disclosure can provide a technique for generating a virtual viewpoint image which can reduce a sense of unnaturalness that a user may experience.

An information processing apparatus according to an embodiment of the present disclosure generates a virtual viewpoint image of an object from a virtual viewpoint based on a three-dimensional model of the object obtained by capturing an image of the object in an imaging area from a plurality of positions. In the following, a description will be given for an image processing system, which includes such an information processing apparatus and a plurality of imaging apparatuses. The image processing system generates a virtual viewpoint image, which represents an appearance from a designated virtual viewpoint, based on a plurality of images, which are based on image capturing by the plurality of imaging apparatuses, and the designated virtual viewpoint. In the present specification, an image is not limited to a still image and may be a video, which has been captured or reproduced over consecutive points in time. In addition, in such a video, the virtual viewpoint may be fixed or may be moving. The virtual viewpoint from which an object is observed while thus moving may also be referred to as camera work.

FIG. 1 illustrates an example of a configuration of the image processing system according to the embodiment of the present disclosure. An image processing system 1 includes the following components.

A plurality of imaging apparatuses 100 capture an image of an imaging area from a plurality of directions. The imaging area may be, for example, an indoor photo studio, a stage on which a play is performed, or the like. The plurality of imaging apparatuses 100 are each placed at a different position so as to surround such an imaging area and perform image capturing in synchronization. The plurality of imaging apparatuses 100 need not be placed along the entire perimeter of the imaging area. For example, for reasons such as limitations of a setup location, configuration may be such that they are placed only at positions that are separated from the imaging area in a specific direction. There is no particular limitation to the number of imaging apparatuses. For example, if the imaging area is a soccer field, approximately 30 imaging apparatuses may be placed around the field. In addition, imaging apparatuses whose functions are different from each other may be placed, and for example, a telescopic camera and a wide-angle camera may be placed.

Imaging apparatus information 111 is data indicating a position and an imaging range for each of the plurality of imaging apparatuses 100. For example, the imaging apparatus information 111 may include parameters representing a three-dimensional position of each of the plurality of imaging apparatuses 100 and parameters representing imaging directions of the imaging apparatuses in pan, tilt, and roll directions. The imaging apparatus information 111 may also include parameters representing sizes of fields of view (angles of view) and resolutions of the imaging apparatuses. The imaging apparatus information 111 can be calculated in advance by performing camera calibration by a method for which there is no particular limitation. For example, it is possible to calculate the imaging apparatus information 111 by associating, with each other, points in a plurality of images, which have been obtained by image capturing in the plurality of imaging apparatuses 100, and performing geometric calculation. Contents of the imaging apparatus information are not limited to the above contents. The imaging apparatus information 111 may include a plurality of parameter sets. For example, the imaging apparatus information 111 may include a plurality of parameter sets corresponding to each of a plurality of frames constituting a moving image, which has been obtained by image capturing in an imaging apparatus. Such imaging apparatus information 111 can indicate a position and a direction of an imaging apparatus at each of a plurality of consecutive points in time.

An object generation apparatus 110 generates a three-dimensional model of an object (a three-dimensional object) based on the respective images, which have been received from the plurality of imaging apparatuses 100, that is, images from a plurality of viewpoints, and the imaging apparatus information 111. However, an information processing apparatus 200 may include functions of the object generation apparatus 110.

Although there is no particular limitation to a type of an object, it may be a person, such as a stage performer, who is a foreground object. Although there is no particular limitation to a method of generating a three-dimensional model, a method that has been described in Japanese Patent Laid-Open No. 2019-144638, for example, may be used. A three-dimensional model of a foreground object, which has been generated by the object generation apparatus 110, is stored as a foreground object 101 and transmitted to the information processing apparatus 200.

A three-dimensional model is data in which information indicating a shape and a color is described. For example, the three-dimensional model may be configured by a textured mesh model or a three-dimensional point group for which each point has been colored. Further, the three-dimensional model may be configured by a set comprising data indicating a shape of an object (e.g., a mesh model or a three-dimensional point group), which is used in image-based rendering to be described later, and captured images. The three-dimensional model may be data in which information indicating a shape is described, and information indicating a color need not be described.

A background object 112 is a three-dimensional model representing an environment in which a three-dimensional model of an object is placed. The background object 112 may be a three-dimensional model of an environment, which is different from a foreground, such as a large concert hall, a soccer stadium, or a small room. The background object 112 may be design data, such as CAD data, or may be data indicating a shape and a color of a background, which has been scanned using a laser scanner or the like. Furthermore, the background object 112 may be generated using a computer vision technology, such as Structure from Motion, using a group of images from a plurality of viewpoints. Such a background object 112 may be loaded in advance into the image processing system 1.

The information processing apparatus 200 according to the embodiment of the present disclosure includes an object obtainment unit 201, an area obtainment unit 202, and a display control unit 203.

The object obtainment unit 201 obtains a three-dimensional model of an object, which has been obtained by capturing an image of an object in an imaging area from a plurality of positions. As described above, the object obtainment unit 201 can obtain the foreground object 101, which has been generated by the object generation apparatus 110. Here, the foreground object 101 may include a three-dimensional model of an object at a plurality of points in time, which corresponds to a shape and a color of an object at a plurality of points in time. The object obtainment unit 201 can further obtain the background object 112.

The area obtainment unit 202 obtains information indicating a position of an object with respect to an imaging area. In the present embodiment, the area obtainment unit 202 obtains area information 102, which describes geometric information of an imaging area, which is surrounded by the plurality of imaging apparatuses 100. The area information 102 can indicate a position and a size of an area in a three-dimensional space and may be cuboid geometric information, which describes center coordinates and a length in each of x-, y-, and z-axes, for example. Such geometric information can be defined by a coordinate system that is used for indicating positions of the imaging apparatuses 100, which are described in the imaging apparatus information 111.

In a case of the present embodiment, the foreground object 101 defines a position of an object in a three-dimensional space, for example, by a coordinate system, which is used for indicating positions of the imaging apparatuses 100, which are described in the imaging apparatus information 111. Therefore, by such area information 102, it is possible to ascertain a position of an object with respect to an imaging area. In particular, in the present embodiment, the foreground object 101 defines a position of each portion of an object in a three-dimensional space. Therefore, by such area information 102, it is possible to ascertain a position of each portion of an object with respect to an imaging area. The area information 102 divides a three-dimensional space into two or more portions and can indicate any shape, such as a sphere or a cylinder. Further, the area information 102 may indicate a plurality of areas. Such area information 102 may be included in the foreground object 101. In addition to a three-dimensional model of an object, the foreground object 101 may also include information indicating a position of the object with respect to an imaging area in a format that is different from the area information 102. The information indicating a position of an object with respect to an imaging area need not be information specifying one location for the position of the object with respect to the imaging area. This information may be information indicating a distance of the object from a boundary of the imaging area.

The display control unit 203 generates a virtual viewpoint image, which includes an object and is from a virtual viewpoint, based on a three-dimensional model of the object. For example, the display control unit 203 can render a virtual viewpoint image indicating a foreground object, which is viewed from a virtual viewpoint 103, based on the foreground object 101, the area information 102, and the virtual viewpoint 103. Further, the display control unit 203 can render in a virtual viewpoint image a background object, which is viewed from the virtual viewpoint 103, based on the background object 112.

Here, the display control unit 203 corrects an object in a virtual viewpoint image in accordance with a position of the object with respect to an imaging area. For example, the display control unit 203 may correct an object at a strength that has been set in accordance with a position of the object with respect to an imaging area in a virtual viewpoint image. In a case of the present embodiment, the display control unit 203 corrects a portion, which is of an object in a virtual viewpoint image and has been selected in accordance with a position of each portion of the object with respect to an imaging area. In other words, the display control unit 203 corrects a portion of an object at a certain degree of strength while correcting another portion of the object at a strength of 0. Further, the display control unit 203 may correct each portion of an object in a virtual viewpoint image at a strength that accords with a position with respect to an imaging area.

The display control unit 203 can select a portion to be corrected or change the strength of the correction in accordance with a distance between an object and a boundary of an imaging area. In an embodiment to be described below, the display control unit 203 corrects an area boundary portion of a foreground object by performing shading processing on the area boundary portion of the object. Also, a strength of shading processing increases as the area boundary portion is approached. With such a configuration, it is possible to perform shading processing on a defect portion of a three-dimensional model of an object when the object is positioned in an area boundary.

The display control unit 203 can also transmit data of a virtual viewpoint image to a display apparatus 300. The display apparatus 300 is an apparatus that is capable of displaying a received virtual viewpoint image and may be, for example, a liquid crystal display, a projector, a head mounted display, or the like.

The virtual viewpoint 103 is data that indicates a position and an imaging range of a virtual viewpoint. For example, the virtual viewpoint 103 can describe a three-dimensional position, a direction, an angle of view, and a resolution of a virtual camera that is virtually present at a virtual viewpoint. The virtual viewpoint 103 may describe this information in the same format as the imaging apparatus information 111. The virtual viewpoint 103 may be received from an operation interface, such as an external controller (not illustrated).

Figure 2:
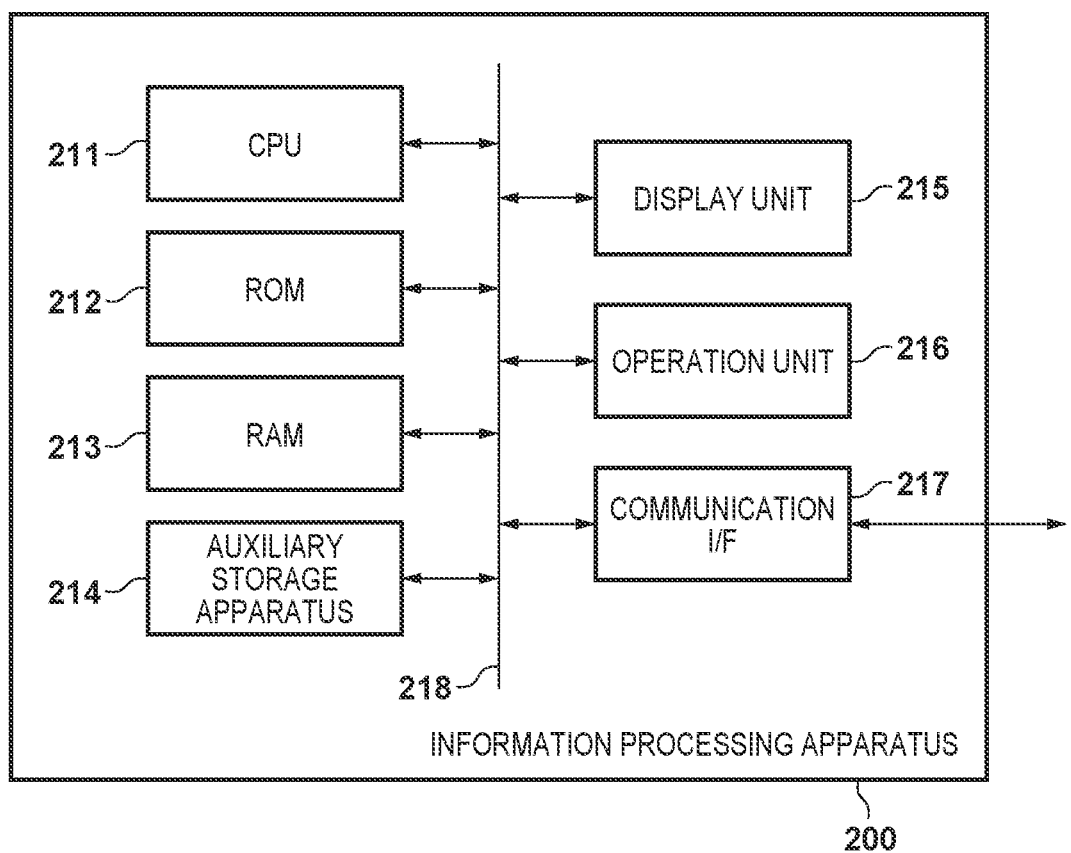
FIG. 2 is a diagram illustrating an example of a hardware configuration of an information processing apparatus according to an embodiment.

FIG. 2 illustrates an example of a hardware configuration of the information processing apparatus 200. The object generation apparatus 110 and the display apparatus 300 can also be realized by the same hardware configuration as the information processing apparatus 200 to be described below.

The information processing apparatus 200 includes a CPU 211, a ROM 212, a RAM 213, an auxiliary storage apparatus 214, a display unit 215, an operation unit 216, a communication I/F 217, and a bus 218. The CPU 211 realizes the respective functions of the information processing apparatus 200, which is illustrated in FIG. 1, by controlling the entire information processing apparatus 200 using computer programs and data that are stored in the ROM 212 or the RAM 213. The information processing apparatus 200 may have one or more pieces of dedicated hardware that are different from the CPU 211 and in such a case, at least a portion of the processing by the CPU 211 can be executed by the dedicated hardware. Examples of dedicated hardware include an application-specific integrated circuit (ASIC), a field-programmable gate array (FPGA), a digital signal processor (DSP), and the like.

The ROM 212 stores programs that do not need to be changed and the like. The RAM 213 temporarily stores a program or data that is supplied from the auxiliary storage apparatus 214, data that is supplied externally via the communication I/F 217, and the like. The auxiliary storage apparatus 214 is configured by a storage, such as a hard disk drive, and stores various kinds of data, such as image data, audio data, or the like. The display unit 215 is configured by a display apparatus, such as a liquid crystal display or an LED, for example, and displays a graphical user interface (GUI), which is used for the user to operate the information processing apparatus 200, and the like. The operation unit 216 is configured by, for example, a keyboard, a mouse, a joystick, a touch panel, or the like and inputs various instructions to the CPU 211 in accordance with operations by the user.

The CPU 211 operates as a display control unit that controls the display unit 215 and an operation control unit that controls the operation unit 216. The communication I/F 217 is used for communication with an apparatus that is external to the information processing apparatus 200. For example, if the information processing apparatus 200 is to be connected with an external apparatus by wire, a cable for communication is connected to the communication I/F 217. If the information processing apparatus 200 is to be connected with an external apparatus by wireless communication, the communication I/F 217 comprises an antenna. The bus 218 communicates information by connecting the respective units of the information processing apparatus 200. In the example of FIG. 2, the display unit 215 and the operation unit 216 are present inside the information processing apparatus 200; however, at least one of the display unit 215 and the operation unit 216 may be present as another apparatus external to the information processing apparatus 200. Further, the information processing apparatus 200 may be configured by a plurality of information processing apparatuses that are connected via a network, for example.

Figure 3:
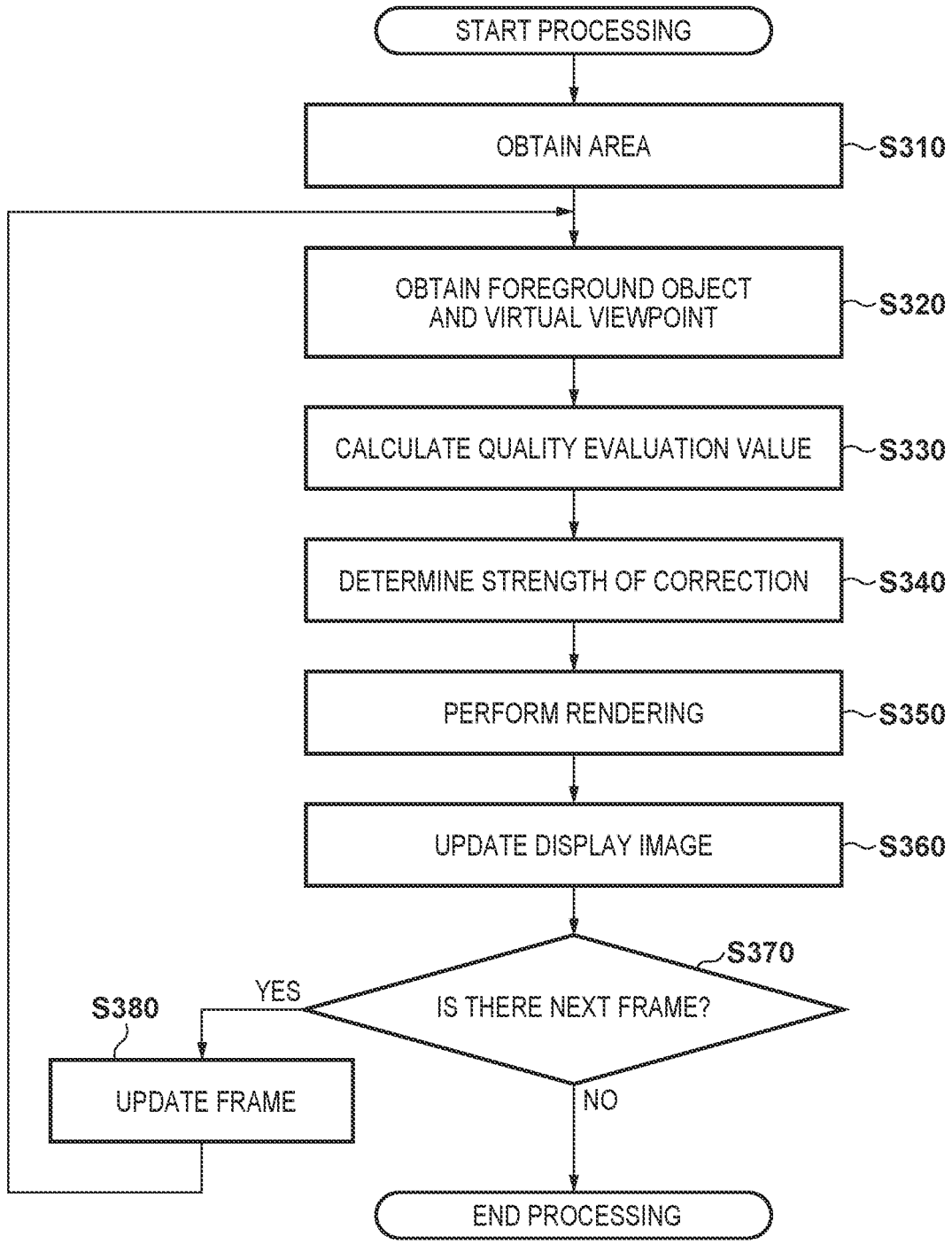
FIG. 3 is a flowchart of an information processing method according to an embodiment.

Next, processing to be performed by the information processing apparatus 200 will be described with reference to FIG. 3. In step S310, the area obtainment unit 202 obtains the area information 102. In this example, the area information 102 indicates as an area a cuboid for which the center is (0,0,2) with respect to an origin (0,0,0) in the same coordinate system as the imaging apparatus information 111 and which spreads 10 m in x-axis and y-axis directions and 4 m in a z-axis direction. The area obtainment unit 202 obtains the area information 102 from the auxiliary storage apparatus 214 and temporarily stores it in the RAM 213.

In step S320, the object obtainment unit 201 obtains the foreground object 101 and the background object 112 and temporarily stores them in the RAM 213. In this example, these objects are three-dimensional mesh polygon data that is stored in a general-purpose format, such as Stanford PLY or Wavefront OBJ, for example. The object obtainment unit 201 may obtain three-dimensional point cloud data in place of a three-dimensional mesh. Further, at the same time, in step S320, the display control unit 203 obtains the virtual viewpoint 103 and temporarily stores it in the RAM 213.

Figure 4:
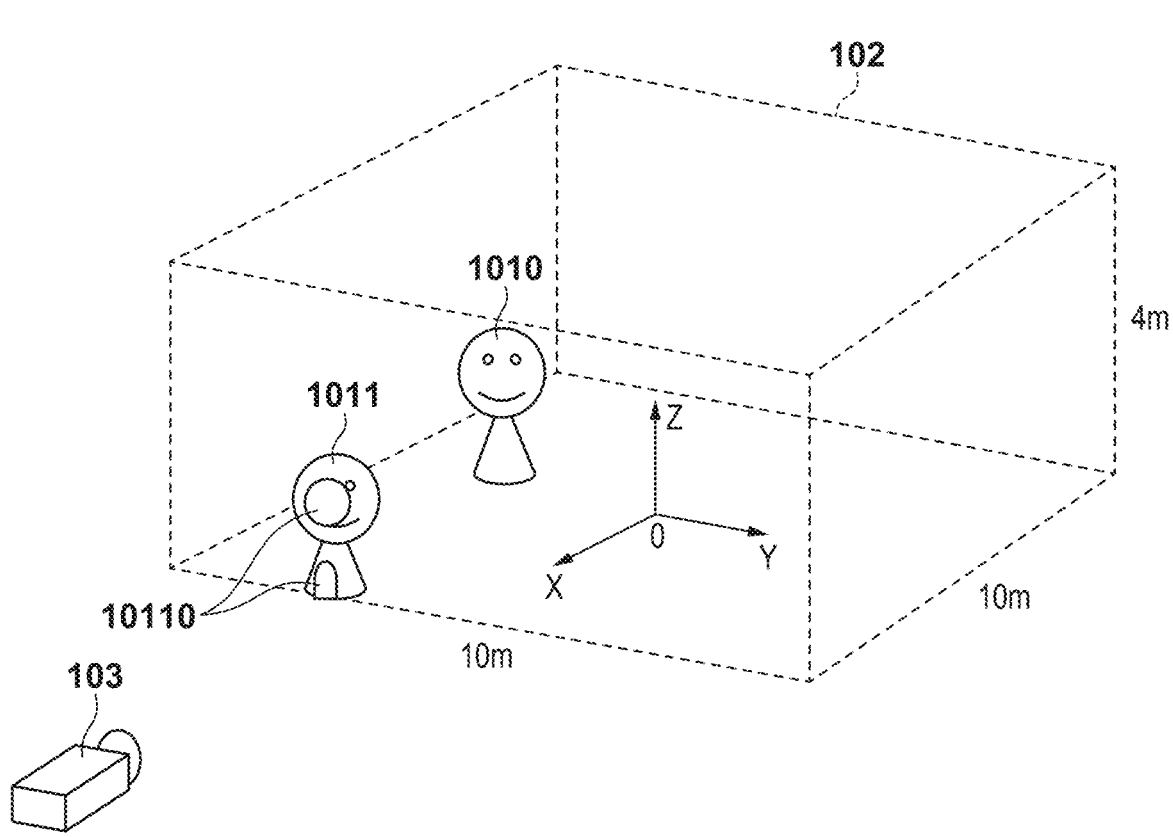
FIG. 4 is a diagram illustrating a relationship between objects, an imaging area, and a virtual viewpoint.

FIG. 4 is a bird's-eye view of an area that is indicated by the area information 102, the foreground objects 101, and a virtual camera that is virtually placed at the virtual viewpoint 103. The foreground objects 101 include objects 1010 and 1011, which represent two people. Since a portion of the face and a portion of the body of the person that is indicated by the object 1011 are outside the area, the object 1011 does not indicate shapes of these portions 10110. The object 1011 has holes at these portions 10110 and is hollow on the inside.

In step S330, the display control unit 203 evaluates a position of an object with respect to an imaging area. In this example, the display control unit 203 calculates quality evaluation values of the foreground objects 101 based on distances between an area indicated in the area information 102 and the foreground objects 101. As illustrated in FIG. 4, a shape of a three-dimensional model is incomplete at the boundary portion of the area. Also, there is a possibility that there may be fewer cameras that are directed to the boundary portion of the area, and thereby, there is a possibility that a quality of an image of an object may become reduced. Thus, the display control unit 203 can estimate or evaluate a quality of an image of each portion of an object in a virtual viewpoint image in accordance with a position of that portion with respect to an imaging area, more specifically, in accordance with a distance of each portion of the object to the boundary portion of the area.

Figure 5A:
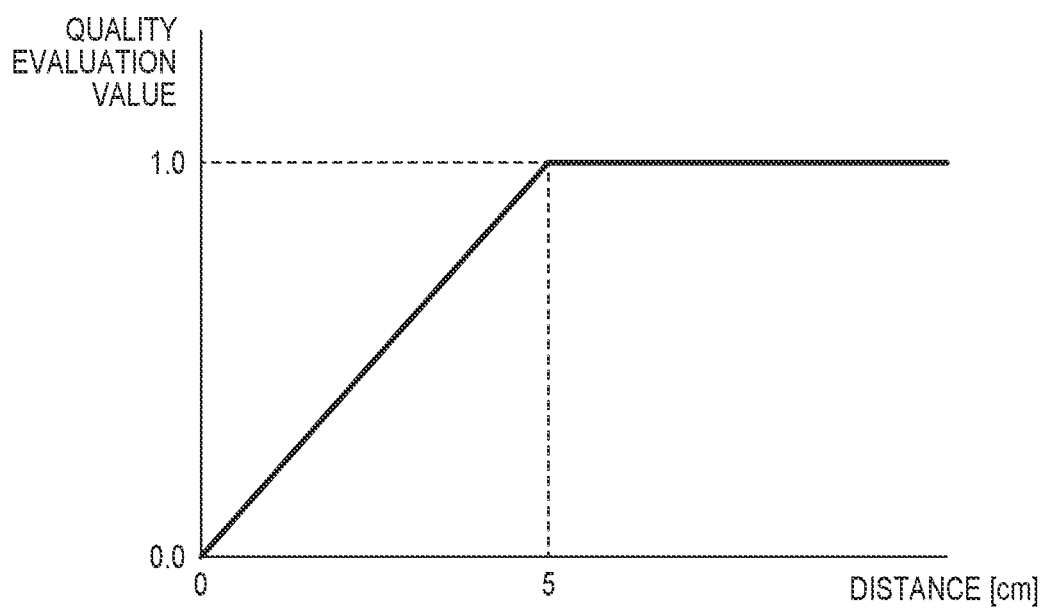
FIGS. 5A and 5B are graphs illustrating an example of a method of calculating a quality evaluation value and a shading processing amount.

A quality evaluation value is calculated for each component of the foreground object 101, that is, for each vertex or three-dimensional point of a mesh. This quality evaluation value may be, for example, a real number in a range of 0 to 1.0 and may take on a smaller value as a shortest distance (a length of a normal) from a component to the boundary portion of the area shortens and may take on a larger value as the shortest distance lengthens. FIG. 5A is a graph representing an example of a relationship between a distance and a quality evaluation value. In FIG. 5A, a horizontal axis indicates a shortest distance between a boundary portion of an area indicated by the area information 102 and a component of the foreground object 101, and a vertical axis indicates the quality evaluation value. In this example, a position of each component of the foreground object 101 is indicated by the same three-dimensional coordinate system as the area information 102 and the imaging apparatus information 111. Thus, the position of each component of the foreground object 101 corresponds to a position of a portion of an object that corresponds to that component. When a component of a foreground object is in contact with the boundary portion of the area, that is, the distance is 0, a quality evaluation value of that component of the foreground object 101 is 0. When the distance is 5 cm, the quality evaluation value is 1.0, and when the distance is longer than that, the quality evaluation value is also 1.0. According to this processing, a quality evaluation value becomes 1.0 for each component of the object 1010, and among components of the object 1011, quality evaluation values of components around the portions 10110, which are outside the area, take on values close to 0.

In this case, the display control unit 203 can interpolate a defect portion of a three-dimensional model of an object. For example, the display control unit 203 can interpolate a defect portion of a three-dimensional model of an object based on distances between portions of the object corresponding to the respective components of the three-dimensional model of the object and the boundary of the imaging area. Specifically, the display control unit 203 can generate, by interpolation, a plane that is surrounded by a contour line in which quality evaluation values are the same in the object 1011. In such a case, quality evaluation values that are the same as that of an outline portion can be applied to the interpolated portion. With this configuration, the shapeless portions 10110 in the objects 1011 can be interpolated and the holes of the objects 1011 can be filled.

Figure 5B:
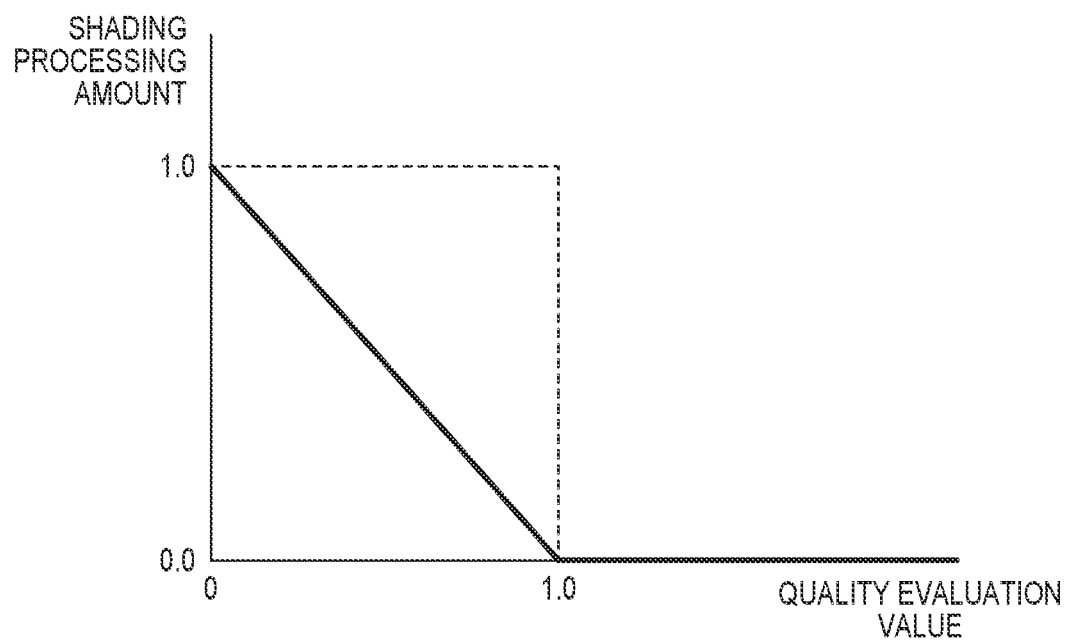

In step S340, the display control unit 203 determines a shading processing amount based on the quality evaluation value. FIG. 5B is an example of a graph representing a relationship between a quality evaluation value and a shading processing amount. In FIG. 5B, a horizontal axis indicates the quality evaluation value and a vertical axis indicates the shading processing amount. The shading processing amount is 1.0 at the boundary portion for which the quality evaluation value is 0. Further, in a portion for which the quality evaluation value is 1.0 or more, the shading processing amount becomes 0, that is, the shading processing is not performed in that portion.

In step S350, the display control unit 203 generates a virtual viewpoint image of the object from the virtual viewpoint based on a three-dimensional model of the object. In this example, the display control unit 203 renders the foreground objects 101 and the background object 112 by projecting them to the virtual viewpoint 103. As a projection method, image-based rendering or model-based rendering as described in Japanese Patent Laid-Open No. 2019-144638 may be used. For example, if the foreground object 101 is a colored three-dimensional model, the color of each point can be projected to a virtual viewpoint image. In addition, if the foreground object 101 is configured by a plurality of images representing the foreground in addition to the three-dimensional shape data, the color of each point can be determined by referring to the images at the time of rendering.

Furthermore, the display control unit 203 corrects the object in the virtual viewpoint image in accordance with the position of the object with respect to the imaging area. In this example, shading processing is performed on the components of the foreground object 101 whose quality evaluation values are less than 1.0. More specifically, a shading image can be superimposed on an area of the virtual viewpoint image with the components of the foreground object 101 whose quality evaluation values are less than 1.0. With such a technique, the display control unit 203 can correct a portion of the object in the virtual viewpoint image selected according to the position with respect to the imaging area.

An example for the processing of the shading processing will be described below. First, a layer image for generating a shading image is prepared. Next, a shading color can be set in advance by user input, and in this example, the color is set to cyan. Then, the shading pattern is rendered on the layer image. The shading pattern may be configured by, for example, a one-pixel thick line that is rendered at intervals of every other pixel. In addition, a two-pixel thick line representing an outline portion is rendered in the layer image. The position of the outline portion can be determined, for example, by projecting to the virtual viewpoint image the components of the foreground object 101 whose quality evaluation values are 0 or the components of the outline portion of the plane that has been interpolated as described above in accordance with the lowest quality evaluation value. Thus, the display control unit 203 can emphasize the outline of the portion, which is in the virtual viewpoint image and corresponds to the defect portion of the three-dimensional model. According to such a configuration, it can be easily understood that the quality-deteriorated portion that on the virtual viewpoint image is due to the defect of the three-dimensional model.

The layer image, which has been thus generated, and the rendered image of the object are alpha-composited with the shading processing amount as a coefficient. That is, the luminance value of each pixel of the virtual viewpoint image to which the foreground object 101 and the background object 112 are projected is defined as (R, G, B), the luminance value of each pixel of the layer image is defined as (Lr, Lg, Lb), and the shading processing amount is defined as a. In such a case, the luminance value (Ro, Go, Bo) of each pixel after the shading processing is calculated as (Ro, Go, Bo)=a×(Lr, Lg, Lb)+(1−a)×(R, G, B).

Figure 6:
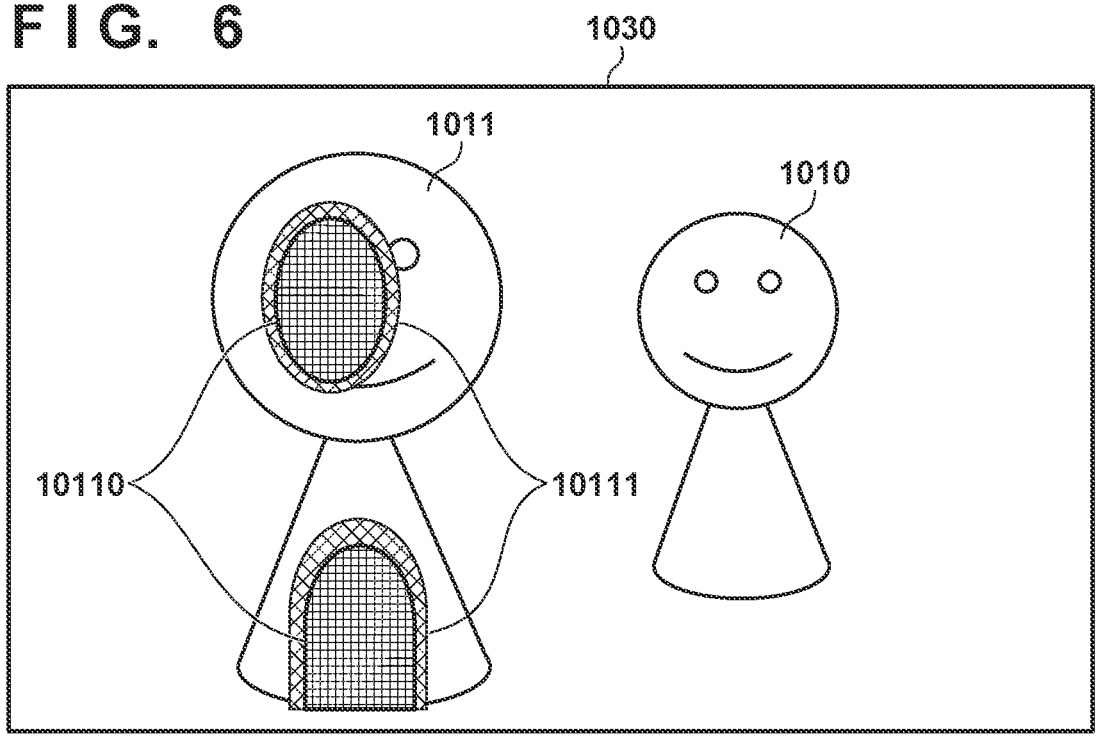
FIG. 6 is a diagram illustrating an example of a virtual viewpoint image.

FIG. 6 illustrates a virtual viewpoint image 1030, which is an example of a result of rendering. The object 1010 is not affected by the shading processing as it is at least 5 cm away from the boundary portion of the area. The shading processing is performed on the shapeless portions 10110 in the object 1011 with a shading processing amount of 1.0. Further, the shading processing is performed on peripheral portions 10111 thereof with a decreasing shading processing amount as it becomes further away from the shapeless portions 10110. Such a method makes it possible to correct each portion of an object in a virtual viewpoint image at a strength that accords with a position with respect to an imaging area. Meanwhile, the shading processing is not performed on a portion that is at least 5 cm away from the boundary portion of the area in the object 1011. If foreground objects overlap each other in a virtual viewpoint image, it is possible to perform rendering such that images of the objects overlap by creating a distance image of each object based on their shape and performing occlusion determination based on the distance image.

In step S360, the display apparatus 300 updates the display of the display using the virtual viewpoint image 1030.

In step S370, the object obtainment unit 201 and the display control unit 203 perform a search in the auxiliary storage apparatus 214 and confirm whether the foreground object 101 and the virtual viewpoint 103 of the next frame are present. If they are present, the frame is updated in step S380 and the processing proceeds to step S320. If they are not present, the processing terminates.

As described above, in the present embodiment, an object in a virtual viewpoint image is corrected in accordance with a positional relationship of the object with respect to an imaging area. Specifically, the shading processing is performed on a portion of the foreground object that is close to the boundary of the imaging area. By thus performing the shading processing on the portion at which the quality of the image of the object is deteriorated in the virtual viewpoint image, it is possible to make the portion that appears unnatural become unnoticeable and reduce the sense of unnaturalness that the user may experience. Further, such a configuration reduces the possibility of the inside of a three-dimensional model being rendered through a portion which is defective in the three-dimensional model due to an object being positioned at the boundary of the area; thereby, the configuration makes it possible to reduce deterioration of image quality.

However, the method of shading processing is not limited to the above method. For example, the shading color and the thickness and spacing of the lines may be changed. In addition, a layer image having a shading pattern may be provided in advance. Further, the method of correcting the object in the virtual viewpoint image is not limited to the shading processing. For example, the display control unit 203 can perform color correction on the object. Specifically, the display control unit 203 may perform shading processing, color blending processing, blurring processing, or transparency processing of the object. When performing the color blending processing, for example, instead of a layer image having a shading pattern, a layer image whose entire surface is filled may be used. Furthermore, instead of performing the shading processing on the portion with the components of the foreground object 101 having a low quality evaluation value, blurring processing using a Gaussian filter or the like may be performed on that portion. Thus, the display control unit 203 can perform correction so as to reduce the visibility of the object using various techniques. With such a configuration, since a portion in which the quality of the virtual viewpoint image is low becomes less noticeable by changing the color of the object in that portion, it is possible to reduce the sense of unnaturalness that the user may experience.

As such another example, a method of making a foreground object that is close to the boundary of the area transparent instead of performing shading processing will be described. In this example, in step S330, the display control unit 203 calculates for each foreground object a quality evaluation value based on the distance between the component closest to the area boundary in the foreground objects and the area boundary. In addition, in step S340, the display control unit 203 determines an alpha value based on the quality evaluation value. For example, the alpha value can be 0 in the boundary portion where the quality evaluation value is 0. In addition, the alpha value can be linearly increased when the quality evaluation value is from 0 to 1.0, and the alpha value can be set to 1.0 when the quality evaluation value is 1.0.

Then, in step S350, the display control unit 203 alpha-blends the foreground object 101 with the background object 112. That is, in each pixel, the luminance value of the foreground object 101 projected to the virtual viewpoint image is defined as (R_fg, G_fg, B_fg), the luminance value of the background object 112 is defined as (R_bg, G_bg, B_bg), and the alpha value is defined as a. In such a case, the luminance value (Ro, Go, Bo) of each pixel after the transparency processing can be calculated as (Ro, Go, Bo)=α×(R_fg, G_fg, B_fg)+(1−α)×(R_bg, G_bg, B_bg).

Figure 7:
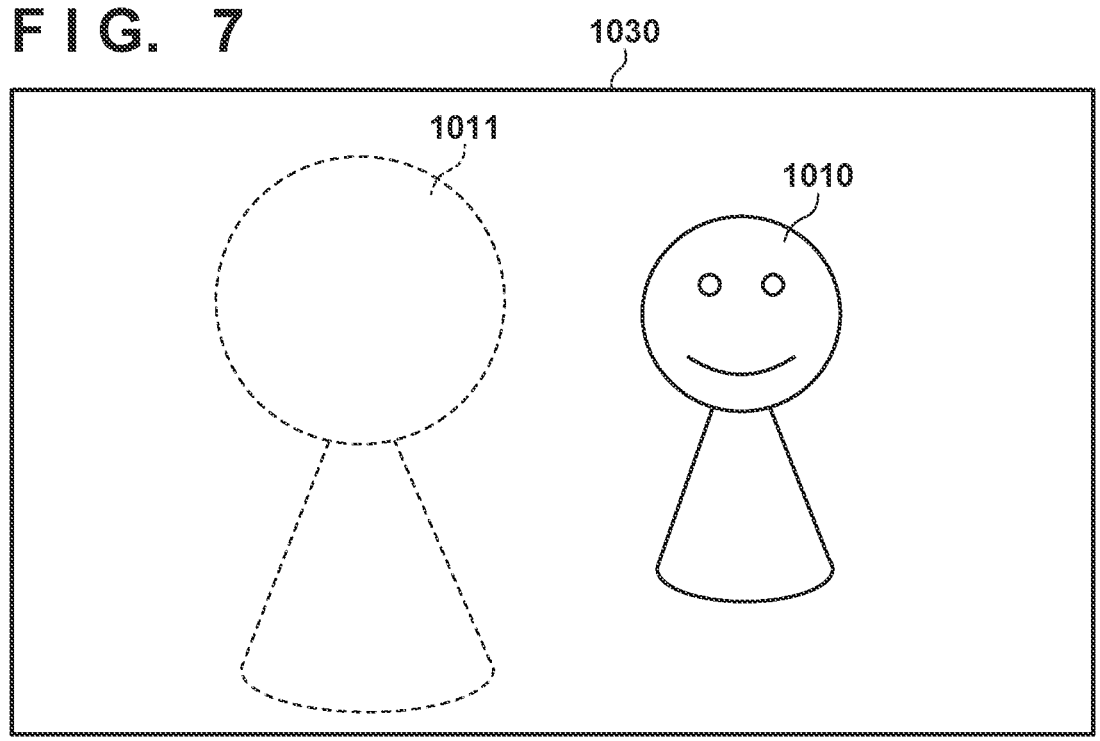
FIG. 7 is a diagram illustrating an example of a virtual viewpoint image.

According to such a method, the transparency processing is performed on the image of an object whose quality deteriorates in a virtual viewpoint image. FIG. 7 illustrates an example of a virtual viewpoint image 1030 that has been thus rendered. The object 1010 is not affected by the transparency processing as it is at least 5 cm away from the boundary portion of the area. Meanwhile, since the object 1011 is in contact with the boundary of the area and the distance is 0, the transparency becomes maximized. That is, correction is performed so that the object 1011 does not appear in the virtual viewpoint image 1030. With this method, the transparency processing is performed on a foreground object so that the closer the foreground object is to the boundary of the area, the more transparent the foreground object becomes. Since an object including a portion having a low quality, such as a portion in which the shape is incomplete, is made transparent even with such transparency processing, it is possible to reduce the sense of unnaturalness that the user may experience and reduce deterioration in image quality.

In the above-described embodiments, the distance between the area boundary and the foreground object is used as the information indicating the positional relationship of the object with respect to the imaging area. Meanwhile, the information indicating the positional relationship of the object with respect to the imaging area is not limited to such a distance. In the following, a description will be given for a case where the strength of correction is changed based on the evaluation value, which has been set in advance at each position in the imaging area based on the placement of the plurality of imaging apparatuses with respect to the imaging area, and the position of the object. In the following example, the quality evaluation value is defined in advance for each point of the imaging area, and correction that is based on the quality evaluation value of the position of the object in the imaging area is performed for the object in the virtual viewpoint image.

The quality evaluation value of each point in the imaging area can be determined in accordance with the image quality at that point, the distance to the imaging apparatus, or the like. As a specific example, a method that is described in Japanese Patent Laid-Open No. 2021-33525 can be used. That is, coordinates to be an evaluation index are set on a grid point in an area. Then, the quality evaluation value can be determined in accordance with the size or position of an object, which is present at each position in the imaging area, in the image, which has been captured by any of the imaging apparatuses. More specifically, when viewing each pair of coordinates from each of eight directions, for example, it is possible to calculate the evaluation value according to an angle, which is formed by the viewpoint, coordinates, and an imaging apparatus for capturing images at an angle that is the closest to the viewpoint, and a resolution at the coordinates in the image capturing by the imaging apparatus.

Here, the imaging apparatus for capturing images at an angle that is the closest to the viewpoint is an imaging apparatus for which the angle formed by the viewpoint, coordinates, and the imaging apparatus is the smallest among the plurality of imaging apparatuses.

In this case, the evaluation value can be calculated as follows. When the above angle is set as θ and the resolution is set as δ (px/mm), the evaluation value q can be q=cos(θ)×(δ−δ_min)/(δ_max−δ_min).

Here δ_min and δ_max are the minimum and maximum values of δ among all grid points and all directions in the area, and the second term in this equation is for normalization such that the value range of q becomes 0 to 1.0. Such an evaluation value can be calculated for each of the eight directions for each grid point. Then, the evaluation value for when viewing the evaluation index that is closest to the foreground object or each component of the foreground object from the direction that is closest to the direction from the virtual viewpoint among the eight directions can be used as the quality evaluation value. The evaluation value thus calculated in advance can be obtained in step S310 from the auxiliary storage apparatus 214 by the display control unit 203 and temporarily stored in the RAM 213.

With such a configuration, it is possible to reduce the sense of unnaturalness that the user may experience by performing, at a higher strength, correction processing, such as shading processing or transparency processing, on a portion of the virtual viewpoint image having a low quality. In particular, deterioration in image quality can be reduced by determining the shading processing amount based on deterioration in quality caused by the number, angle, or resolution of cameras that are capturing an image of each point in the area.

Methods of evaluating these qualities can also be used in combination. For example, the quality evaluation value that has been calculated based on the distance from the area boundary and the above-described quality evaluation value that has been defined in advance for each point in the area may be integrated, and the strength of correction processing may be determined based on the integrated quality value.

Integration methods include a method of calculating a statistical amount, such as an average, a minimum, or a maximum. Further, three or more types of quality evaluation values may be integrated and used.

So far, a method of performing correction on an object in a virtual viewpoint image according to a position of the object with respect to an imaging area has been described. In the following, a description will be given for a method of performing correction on a portion in which a backface of a three-dimensional model is visible in the virtual viewpoint image. In the following example, frontface and backface analysis is performed using a shape of a foreground object without using area information.

The information processing apparatus 200 according to this embodiment includes a shape analysis unit 221 instead of the area obtainment unit 202. The shape analysis unit 221 determines a backface of each portion of a three-dimensional model of an object. Here, a frontface of a three-dimensional model refers to a surface side of an object corresponding to the three-dimensional model, and a backface of a three-dimensional model refers to an inner side of an object corresponding to the three-dimensional model. Specifically, when a three-dimensional shape of an object is represented by mesh data, the backface is a back face of a polygon constituting the mesh data and representing a surface of the object. A normal direction is determined for such a polygon, and a polygon has a frontface and a backface with respect to that normal direction. The shape analysis unit 221 thus analyzes the frontface and backface based on a shape of an object and transmits an analysis result to the display control unit 203. Then, the display control unit 203 determines a portion where a backface of a three-dimensional model is visible in a virtual viewpoint image and performs correction for the portion in which a backface is visible.

Such an embodiment can also be performed according to the flowchart indicated in FIG. 3, and in the following a description will be given for portions that are different from the above embodiment. Step S310 is omitted. In step S330, the shape analysis unit 221 determines a direction of a backface in each portion of the three-dimensional model. For example, the shape analysis unit 221 can determine the frontface and backface of a component, such as a plane or a point, of the three-dimensional model. If normal information indicating the frontface and backface is included in a three-dimensional model of a foreground object, the shape analysis unit 221 can use this normal information. Meanwhile, if such normal information is not included, the shape analysis unit 221 can newly calculate the normal information.

A normal of a face (of a polygon) can be calculated as follows. That is, two vectors are determined so that the vertices constituting the face are connected in order, and then a direction of the outer product the vectors corresponds to a direction of the normal. Furthermore, it is possible to determine a face whose normal is directed to the outside of a foreground object based on whether the inner product of a vector that is directed from one point defined outside of the object to a plane or a point on the object and the vector of the normal, which has been obtained earlier, is positive or negative, and this face is determined to be a frontface. Further, the opposite face is the backface. A configuration may be taken so as to calculate an average of vectors directed from a portion of interest on the object to various other portions of the same object and determine as a backface a face that is facing an end point of the vector in the portion of interest. In addition, a normal of a point can be calculated as follows. When focusing on one of the vertices on an object, an average of the normal vectors of a plurality of adjacent planes can be obtained and used as the normal of the vertex.

Further, the shape analysis unit 221 sets the quality evaluation value of the frontface of the foreground object high and the quality evaluation value of the backface lower than that. For example, the quality evaluation value of the frontface can be set to 1.0, and the quality evaluation value of the backface can be set to 0.

Thereafter, in step S340, the display control unit 203 determines the strength of correction, such as shading processing or transparent processing, based on the quality evaluation value. In this example, the display control unit 203 can project the foreground object to the virtual viewpoint and set the shading processing amount to 1.0 for the pixels on which the backface of the foreground object is projected and set the shading processing amount to 0 for the pixels on which the frontface of the foreground object is projected. The shading processing amount of the pixels on which the backface is projected may be set according to user input. In addition, the quality evaluation value or the strength of correction may be determined according to the distance between the virtual viewpoint and the object, the surface area of the area where the backface is projected, or the like.

As described above, by performing correction based on shape analysis of the foreground object, even if there is no area information, it is possible to reduce the sense of unnaturalness that the user may experience from a portion having a low quality, such as a portion on which a backface of an object is displayed. Of course, a combination of correction based on shape analysis of a foreground object and correction based on a positional relationship of an object with respect to an imaging area may be used.

In the above embodiment, a description has been given mainly for rendering of a foreground object. Meanwhile, correction as describe above can be performed for rendering a shadow that a foreground object casts onto another foreground object or a background object. That is, such rendering of a shadow of a foreground object is also included in the rendering of a foreground object in the present specification. In this case, the correction for an image of a foreground object can also be applied to a shadow of the foreground object. That is, the display control unit 203 may render a shadow of an object in a virtual viewpoint image and correct a shadow of an object in the virtual viewpoint image at a strength that has been set in accordance with the position.

As an example, a case where transparency processing is performed on a shadow will be described. In this case, it is possible to create a layer image in which only shadows are rendered by ray tracing after having performed settings for a light source in accordance with a method of rendering shadows in a typical computer graphics technique. Further, a transparent shadow can be rendered by alpha blending the layer image to be applied with the same alpha value as the foreground object and the virtual viewpoint image on which the background object has been rendered. According to such a configuration, it is possible to correct a virtual viewpoint image such that the shadow of an object becomes transparent in accordance with the object becoming transparent based on the positional relationship with respect to the area, and thereby it is possible to reduce the sense of unnaturalness that the user may experience.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-013580, filed Jan. 31, 2022, which is hereby incorporated by reference herein in its entirety.

What is claimed is:

1. An information processing apparatus comprising one or more processors and one or more memories storing one or more programs which cause the one or more processors to:
   obtain a three-dimensional model of an object, which has been obtained by capturing an image of the object in an imaging area from a plurality of positions, and information indicating a position of the object with respect to the imaging area;
   change a strength of correction in accordance with a distance between the object and a boundary of the imaging area;
   interpolate a defect portion of the three-dimensional model of the object based on a distance between a portion of the object that corresponds to each component of the three-dimensional model of the object and the boundary of the imaging area; and
   generate a virtual viewpoint image that includes the object based on the three-dimensional model of the object through performing the correction that accords with a position of the object, on the object in the virtual viewpoint image.

2. The information processing apparatus according to claim 1, wherein the one or more programs cause the one or more processor to:
   obtain information indicating a position of each portion of the object with respect to the imaging area; and
   correct a portion of the object in the virtual viewpoint image, the portion having been selected in accordance with the position of each portion of the object.

3. The information processing apparatus according to claim 1, wherein the one or more programs cause the one or more processors to:
   obtain information indicating a position of each portion of the object with respect to the imaging area; and
   perform correction on each portion of the object in the virtual viewpoint image at a strength that accords with the position of each portion of the object.

4. The information processing apparatus according to claim 1, wherein the one or more programs cause the one or more processor to:
   change a strength of the correction based on an evaluation value that has been set in advance for each position in the imaging area based on a placement of a plurality of imaging apparatuses with respect to the imaging area, and the position of the object.

5. The information processing apparatus according to claim 4, wherein
   the evaluation value for a position in the imaging area is determined in accordance with a size or a position of the object in an image that has been captured by any one of the imaging apparatuses, the object being present in the position.

6. The information processing apparatus according to claim 1, wherein the one or more programs cause the one or more processor to:
   render a shadow of the object in the virtual viewpoint image and perform, on the shadow of the object in the virtual viewpoint image, correction at a strength that accords with the position of the object.

7. The information processing apparatus according to claim 1, wherein the correction is color correction.

8. The information processing apparatus according to claim 1, wherein the correction is shading processing, color blending processing, blurring processing, or transparency processing of the object.

9. The information processing apparatus according to claim 1, wherein the one or more programs cause the one or more processor to:
   emphasize an outline of a portion in the virtual viewpoint image, the portion corresponding to a defect portion of the three-dimensional model.

10. The information processing apparatus according to claim 1, wherein the one or more programs cause the one or more processor to:
    perform the correction so as to reduce a visibility of the object.

11. An information processing method comprising:
    obtaining a three-dimensional model of an object, which has been obtained by capturing an image of the object in an imaging area from a plurality of positions, and information indicating a position of the object with respect to the imaging area;
    changing a strength of correction in accordance with a distance between the object and a boundary of the imaging area;
    interpolating a defect portion of the three-dimensional model of the object based on a distance between a portion of the object that corresponds to each component of the three-dimensional model of the object and the boundary of the imaging area; and
    generating a virtual viewpoint image that includes the object based on the three-dimensional model of the object through performing the correction that accords with a position of the object, on the object in the virtual viewpoint image.

12. A non-transitory computer-readable medium storing a program executable by a computer to perform a method comprising:
- obtaining a three-dimensional model of an object, which has been obtained by capturing an image of the object in an imaging area from a plurality of positions, and information indicating a position of the object with respect to the imaging area;
- changing a strength of correction in accordance with a distance between the object and a boundary of the imaging area;
- interpolating a defect portion of the three-dimensional model of the object based on a distance between a portion of the object that corresponds to each component of the three-dimensional model of the object and the boundary of the imaging area; and
- generating a virtual viewpoint image that includes the object based on the three-dimensional model of the object through performing the correction that accords with a position of the object, on the object in the virtual viewpoint image.

* * * * *